US010733192B1

United States Patent
Hegde et al.

(10) Patent No.: US 10,733,192 B1
(45) Date of Patent: Aug. 4, 2020

(54) EXPRESSION EVALUATION INFRASTRUCTURE

(71) Applicants: Prabhat Hegde, Bangalore (IN); Jayanth Saimani, Bangalore (IN); Ajay Karthik Nama Nagaraj, Bangalore (IN); Vikram Chunduru, Vijayawada (IN); Reetendra Singh Chauhan, Lucknow (IN)

(72) Inventors: Prabhat Hegde, Bangalore (IN); Jayanth Saimani, Bangalore (IN); Ajay Karthik Nama Nagaraj, Bangalore (IN); Vikram Chunduru, Vijayawada (IN); Reetendra Singh Chauhan, Lucknow (IN)

(73) Assignee: Intuit Inc., Mountain View, CA (US)

( * ) Notice: Subject to any disclaimer, the term of this patent is extended or adjusted under 35 U.S.C. 154(b) by 253 days.

(21) Appl. No.: 15/896,927

(22) Filed: Feb. 14, 2018

(51) Int. Cl.
  *G06F 16/2457* (2019.01)
  *G06Q 10/06* (2012.01)
  *G06F 16/9038* (2019.01)
  *G06F 8/36* (2018.01)

(52) U.S. Cl.
  CPC .... *G06F 16/24575* (2019.01); *G06F 16/9038* (2019.01); *G06Q 10/067* (2013.01); *G06F 8/36* (2013.01)

(58) Field of Classification Search
  CPC .............. G06F 16/24575; G06F 16/9537
  See application file for complete search history.

(56) References Cited

U.S. PATENT DOCUMENTS

| | | | | |
|---|---|---|---|---|
| 7,668,809 B1* | 2/2010 | Kelly | ................... | G06Q 10/02 707/713 |
| 2005/0267871 A1* | 12/2005 | Marchisio | ........... | G06F 16/3338 |
| 2010/0070448 A1* | 3/2010 | Omoigui | ............ | H01L 27/1463 706/47 |
| 2011/0043652 A1* | 2/2011 | King | ................... | G06F 40/197 348/222.1 |
| 2012/0030228 A1* | 2/2012 | Naidu | ................... | G06F 16/951 707/767 |
| 2013/0110872 A1* | 5/2013 | Barga | ................... | G06F 16/242 707/771 |
| 2016/0125497 A1* | 5/2016 | Legrand | ............. | G06F 16/2425 705/26.62 |
| 2016/0179953 A1* | 6/2016 | Klotz, Jr. | ............. | G06F 16/951 707/722 |
| 2018/0150525 A1* | 5/2018 | Daniel | ................ | G06F 16/9537 |
| 2018/0329744 A1* | 11/2018 | Shear | ................... | G06F 9/5072 |

\* cited by examiner

*Primary Examiner* — Giovanna B Colan
(74) *Attorney, Agent, or Firm* — Ferguson Braswell Fraser Kubasta PC

(57) ABSTRACT

A method may include obtaining, from a user, an initial expression including an operator and an input extracted from a data source. The operator may be applied to the input. The method may further include obtaining, using a contextual mapping data structure, a contextualized expression including the input and the data source. The contextual mapping data structure may include a context corresponding to the user. The method may further include generating a result by evaluating the contextualized expression, obtaining, using a rule table, a validation rule corresponding to the contextualized expression, and triggering an alert in response to applying the validation rule to the result.

17 Claims, 10 Drawing Sheets

EXPRESSION EVALUATION INFRASTRUCTURE

BACKGROUND

Requirements for software applications inevitably evolve over time and are often customized for different users. For example, requirements may vary by region (e.g., different countries), such as different tax filing and reporting requirements. When software applications are hardcoded to comply with specific requirements, re-coding is inevitable as requirements change and/or new demands for customization arise. There is therefore a need for a flexible infrastructure upon which rapidly adaptable software applications may be developed and/or customized, with minimal expenditure of time and resources, where existing code is reused as much as possible.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, from a user, an initial expression including an operator and an input extracted from a data source. The operator is applied to the input. The method further includes obtaining, using a contextual mapping data structure, a contextualized expression including the input and the data source. The contextual mapping data structure includes a context corresponding to the user. The method further includes generating a result by evaluating the contextualized expression, obtaining, using a rule table, a validation rule corresponding to the contextualized expression, and triggering an alert in response to applying the validation rule to the result.

In general, in one aspect, one or more embodiments relate to a system including a processor, data sources, and a repository configured to store operators, contexts, initial expressions, contextualized expressions, a rule table, and a contextual mapping data structure configured to map the initial expressions to the contextualized expressions using the contexts. The system further includes a memory including instructions that, when executed by the processor, cause the processor to obtain, from a user, an initial expression including an operator and an input extracted from a data source. The operator is applied to the input. The instructions further cause the processor to obtain, using a contextual mapping data structure, a contextualized expression including the input and the data source. The contextual mapping data structure includes a context corresponding to the user. The instructions further cause the processor to generate a result by evaluating the contextualized expression, obtain, using the rule table, a validation rule corresponding to the contextualized expression, and trigger an alert in response to applying the validation rule to the result.

In general, in one aspect, one or more embodiments relate to a graphical user interface (GUI) including an expression workspace including an expression control that accepts, from a user, an initial expression including an operator and an input extracted from a data source, and a result control that displays a result generated by evaluating a contextualized expression. The contextualized expression is obtained using a contextual mapping data structure. The contextualized expression includes the input and the data source. The contextual mapping data structure includes a context corresponding to the user.

Other aspects of the invention will be apparent from the following description and the appended claims.

DETAILED DESCRIPTION

Figure 1A:
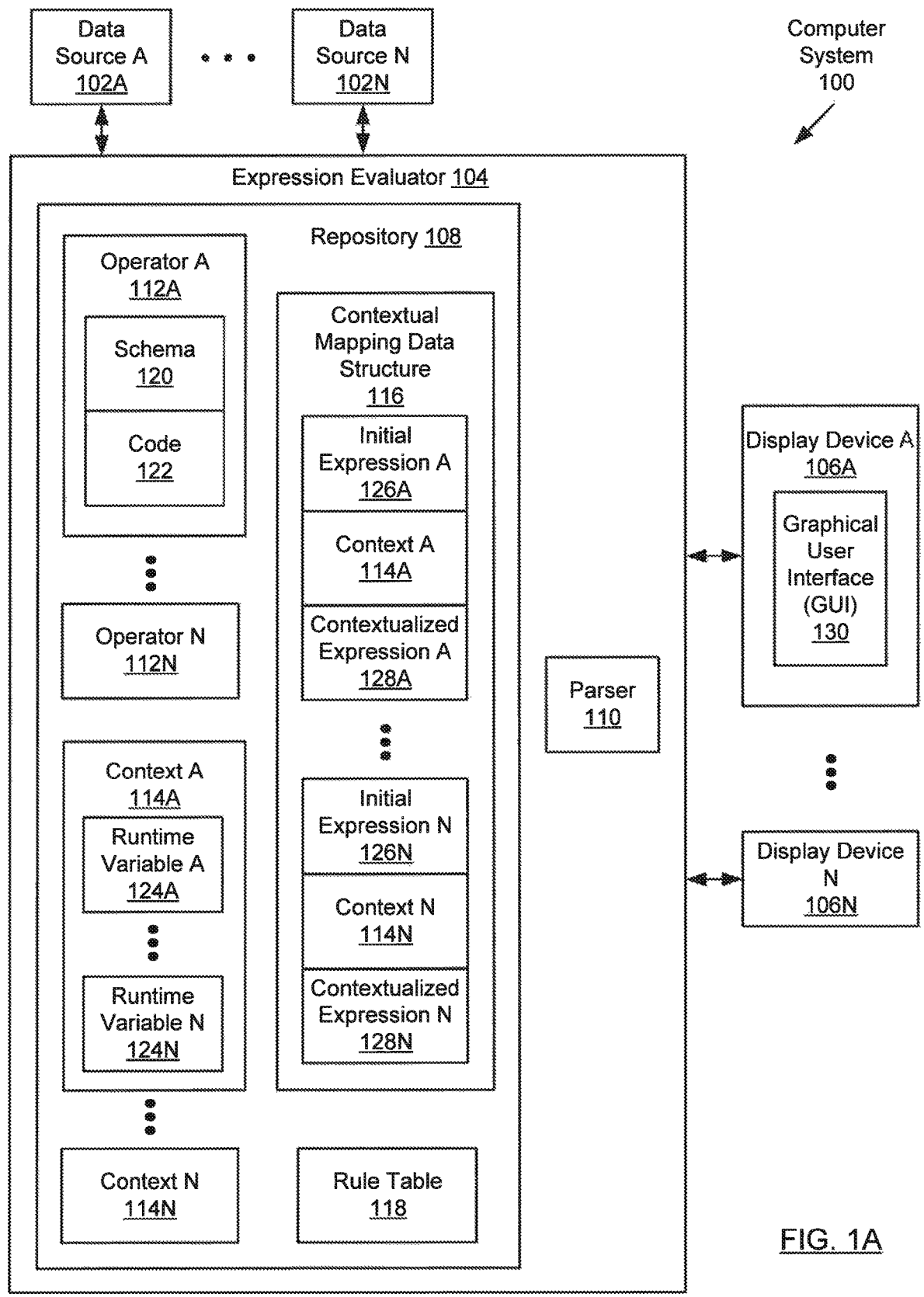
FIG. 1A, FIG. 1B, and FIG. 1C show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to an expression evaluation infrastructure that facilitates adaptation of an initial expression relative to a context. The initial expression may be any expression that includes an operator applied to one or more inputs. For example, an initial expression that generates an expense report may include operators that: 1) extract accounts, and 2) aggregate the expenses of the accounts.

Instead of hardcoding variations of a complex expression (e.g., a tree of sub-expressions representing a workflow), an initial expression may be rapidly and automatically adapted to a context of a user to generate a contextualized expression, while reusing existing code. In one or more embodiments, the context includes the values of one or more runtime variables representing properties and/or attributes describing the environment and/or preferences of a user. For example, a variable in the context may represent a region (e.g., France) associated with the user, or may represent a formatting preference (e.g., JavaScript Object Notation (JSON)) associated with the user. In one or more embodiments, the contextualized expression represents a variation of the initial expression that is adapted to the context (e.g., by recombining building blocks, without re-coding the implementation of any building block). For example, a contextualized expression that generates an expense report may include operators that: 1) extract accounts, 2) filter out specific accounts to include in the expense report, and 3) aggregate the expenses of the specific accounts. That is, in this example, the contextualized expression added a filter operator that was not present in the corresponding initial expression.

In one or more embodiments, a validation rule associated with the context is applied to the result. For example, in a specific context, the result of evaluating an operator may be required to be within a predetermined range of values. If the validation rule is violated, then an alert may be triggered to notify the user of the violation, so that a revised expression may be received from the user (e.g., via a graphical user interface (GUI)), to eliminate the violation.

FIG. 1A shows a computer system (100) in accordance with one or more embodiments of the invention. As shown in FIG. 1A, the computer system (100) includes data sources (102A, 102N), an expression evaluator (104), and display devices (106A, 106N). In one or more embodiments, the computer system (100), the expression evaluator (104), and/or display devices (106A, 106N) take the form of the computing system (500) described with respect to FIG. 5A and the accompanying description below, or take the form of the client device (526) described with respect to FIG. 5B.

In one or more embodiments, a data source (102A, 102N) includes structured data that represents relationships among various entities. In one or more embodiments, each portion of the data source (102A, 102N) may include a timestamp. A database record is one example of structured data, where the database record represents relationships among various entities (e.g., field values). Examples of data sources (102A, 102N) include systems (e.g., database systems) for storing structured data about the financial transactions of a user, such as Mint® and Intuit® QuickBooks Online® (Mint, Intuit, and QuickBooks Online are trademarks of Intuit, Inc., Mountain View, Calif.), etc. Other examples of data sources (102A, 102N) include systems for storing structured data about the activities of a user, such as inventory systems, as well as systems for storing sensor data (e.g., data obtained from Internet of Things (IoT) devices), etc.

In one or more embodiments, the expression evaluator (104) includes a repository (108) and a parser (110). In one or more embodiments, the repository (108) may be any type of storage unit and/or device (e.g., a file system, database, collection of tables, or any other storage mechanism) for storing data. Further, the repository (108) may include multiple different storage units and/or devices. The multiple different storage units and/or devices may or may not be of the same type or located at the same physical site.

In one or more embodiments, the repository (108) includes operators (112A, 112N), contexts (114A, 114N), a contextual mapping data structure (116), and a rule table (118). An operator (112N) may be applied to one or more inputs to yield one or more results. In one or more embodiments, an operator (112N) includes a schema (120) and code (122). The schema (120) may define constraints on the inputs and/or results of the operator (112N). For example, the schema (120) may indicate that the inputs and/or results of the operator (112N) be represented in a specific format (e.g., as objects, as JavaScript Object Notation (JSON), as money, etc.). The code (122) may implement the operator (112N), for example, via an application programming interface (API).

Examples of operators (112A, 112N) include: accessing a data source (102N), extracting data (e.g., extracting a row, column, or cell of already-accessed data), navigating data (e.g., via a path expression that traverses structured data, for example, represented in JavaScript Object Notation (JSON) or eXtended Markup Language (XML)), formatting data (e.g., converting data from one format to another format), aggregating data (e.g., summarizing data in a report), validating data (e.g., using data obtained from one data source to validate data contained in another data source), arithmetic operators (e.g., +, −, *, /, etc.), adding or modifying transactions (e.g., financial or inventory transactions), analyzing data (e.g., statistical or predictive analyses), filters (e.g., that apply predicates to a stream of data), sorting, and Boolean operators (e.g., and, or, not, etc.). An operator (112N) may be decomposed into multiple sub-operators (e.g., a report-generating operator may be decomposed into sub-operators that generate components of the report).

In one or more embodiments, a context (14A, 114N) includes the values of runtime variables (124A, 124N). Runtime variables (124A, 124N) may represent properties and/or attributes (e.g., stored in a configuration file) that describe the environment and/or preferences of a user. For example, the value of a runtime variable (124N) may represent a region or location (e.g., France) associated with a user, or may represent a formatting preference (e.g., JSON) associated with a user. As another example, the value of a runtime variable (124N) may represent a data source (102N) associated with a user (e.g., a data source (102N) used in the evaluation of expressions).

Continuing with FIG. 1A, in one or more embodiments, the contextual mapping data structure (116) includes initial expressions (126A, 126N), contexts (114A, 114N), and contextualized expressions (128A, 128N). The contextual mapping data structure (116) may map an initial expression (126N) to a contextualized expression (128N) using a context (114N) of the user.

In one or more embodiments, an initial expression (126N) may be any expression that includes one or more operators (112A, 112N) that are each applied to one or more inputs. For example, an initial expression (126N) that generates an expense report may include operators that: 1) extract accounts, and 2) aggregate the expenses of the accounts.

Similarly, a contextualized expression (128N) may be any expression that includes one or more operators (112A, 112N) that are each applied to one or more inputs. For example, a contextualized expression (128N) that generates an expense report may include operators that: 1) extract accounts, 2) filter out specific accounts to include in the expense report, and 3) aggregate the expenses of the specific accounts. That is, in this example, the contextualized expression (128N) added a filter operator that was not present in the corresponding initial expression (126N).

The contextual mapping data structure (116) may map an initial expression (126N) to multiple contextualized expressions (128A, 128N) using multiple contexts (114A, 114N) (e.g., where the multiple contexts (114A, 114N) correspond to different users or different regions). For example, the contextual mapping data structure (116) may map an initial expression (126N) to one contextualized expression when the context (114N) includes the region "France" and may map the same initial expression (126N) to another contextualized expression when the context (114N) includes the region "Britain".

Figure 1B:
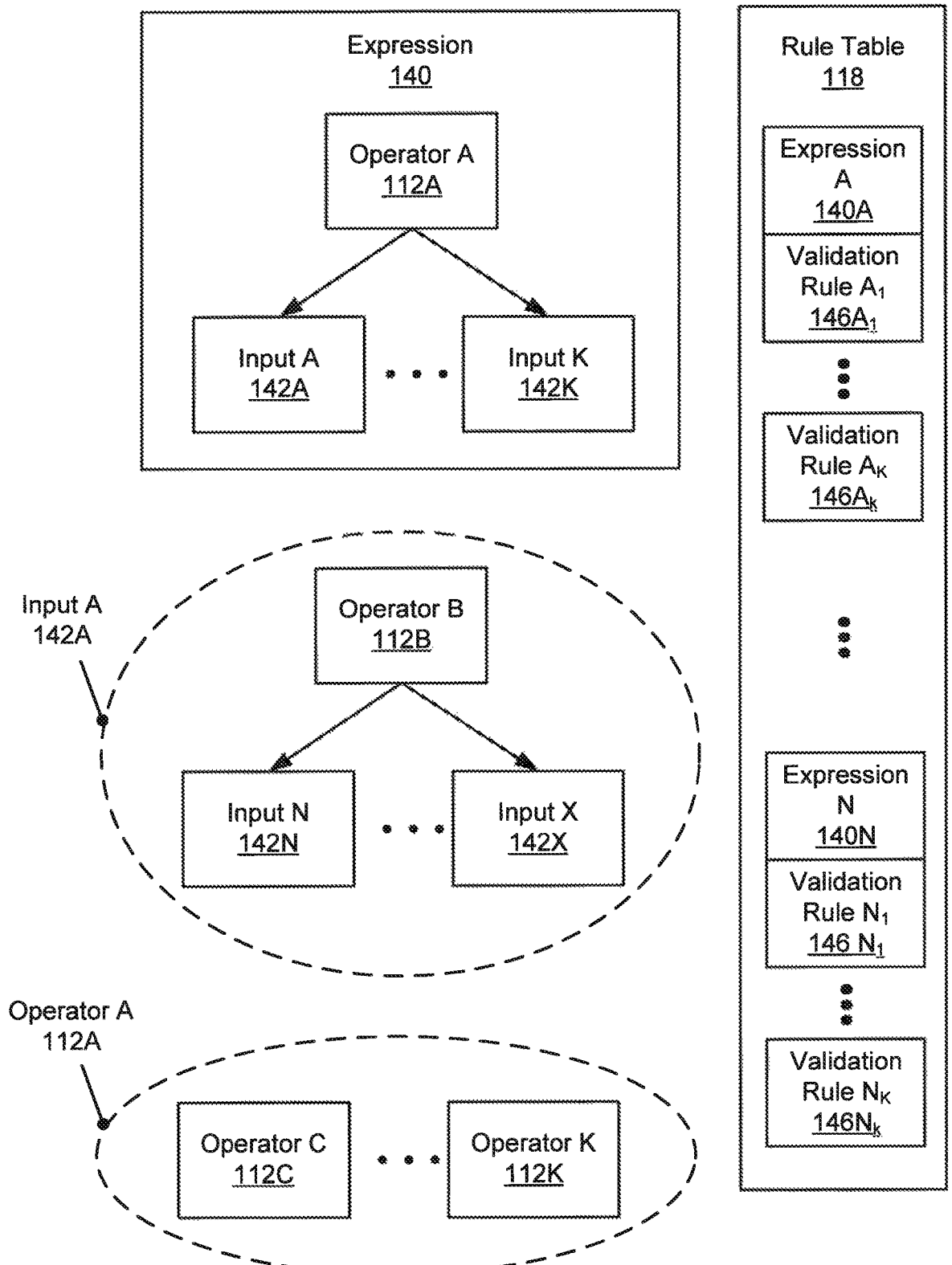

FIG. 1B shows that an expression (140) may include an operator (112A) applied to one or more inputs (142A, 142K). FIG. 1B also illustrates that an expression (140) may be recursive, such that an input (142A, 142K) may be expanded into a tree of sub-expressions, where each sub-expression, in turn, includes an operator (e.g., (112B)) and one or more inputs (e.g., (142N, 142X)). For example, as shown in FIG. 1B, an input (142A) may itself be a result of applying an operator (112B) to one or more inputs (142N, 142X). That is, an expression tree may be formed where the result of one expression (140) becomes an input to an operator (112A) in another expression (140), etc.

Alternatively, FIG. 1B also illustrates that an expression (140) may be recursive, such that an operator A (112A) may include other operators (112C, 112K). For example, the operators (112C, 112K) shown in FIG. 1B may be performed in parallel, sequentially, or some combination thereof, while executing operator A (112A). An expression tree may be formed where a top-level operator includes sub-operators, each of which may include sub-sub-operators, etc.

Continuing with FIG. 1B, the expression (140) may be part of a statement in a language that is defined by a grammar (e.g., a grammar corresponding to a programming language or a query language). Simple examples of expressions (140) include: x=a+b and y=a*c+x. An example of an expression (140) that includes a tree of sub-expressions is: x=(a*(b*(c+d)−(e/f))).

In one or more embodiments, the rule table (118) includes one or more validation rules (e.g., (146$A_1$, 146$A_K$), (146$N_1$, 146$N_K$)) corresponding to an expression (e.g., (140A, 140N). In one or more embodiments, a validation rule (146$N_1$) may represent constraints applicable to the evaluation of an expression (140N). For example, a validation rule (146$N_1$) may require a result of an expression (140N) to be within a predetermined range of values (e.g., an income level may be required to be within a minimum value and a maximum value).

In one or more embodiments, applying a validation rule (146$N_1$) corresponding to an expression (140A, 140N) may modify the expression (140A, 140N). For example, applying the validation rule (146$N_1$) may add, modify or delete a sub-expression of the expression (140A, 140N). For example, applying a validation rule (146$N_1$) may add a new sub-expression to compare, reconcile and/or categorize the results of different sub-expressions within the expression (140A, 140N). In one or more embodiments, applying a validation rule (146$N_1$) corresponding to an expression (140A, 140N) may trigger the evaluation of another expression (140A, 140N).

Returning to FIG. 1A, in one or more embodiments, a display device (106A, 106N) includes a graphical user interface (GUI) (130) operatively connected to the expression evaluator (104). The GUI (130) may include functionality to receive input from a user and present information to the user via the display device (106A, 106N), generally through graphical, text, audio, and/or any other input/output representations.

Figure 1C:
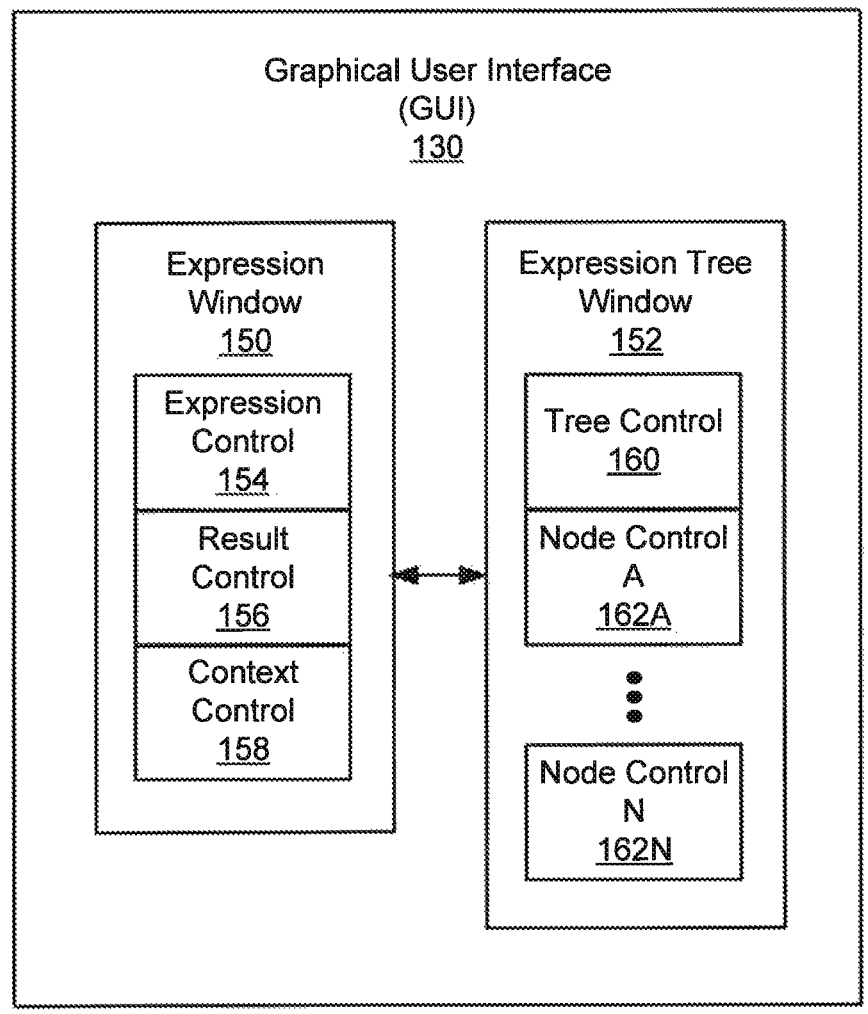

As shown in FIG. 1C, in one or more embodiments, the GUI (130) includes an expression window (150) and an expression tree window (152). The expression window (150) may include an expression control (154), a result control (156), and a context control (158). In one or more embodiments, the expression control (154) includes functionality to permit a user to enter and/or revise an expression (e.g., (140) of FIG. 1B). For example, the expression may be entered as a string of alphanumeric characters. In one or more embodiments, the expression may be a named expression, such as "profit and loss report". The expression control (154) may include functionality to evaluate an expression displayed in the expression control (154) (e.g., in response to user input, such as clicking on an "evaluate" button of the expression control (154)). The result control (156) may include functionality to display a result of evaluating an expression. For example, the result may be displayed in a variety of formats (e.g., JSON, alphanumeric string, money, etc.). In one or more embodiments, the format of the result is explicitly indicated by a formatting operator within the expression. The context control (158) may include functionality to display a context (e.g., (114N) of FIG. 1A) associated with a user. The context control (158) may also include functionality to obtain the context based on input received from the user. The context control (158) may also include functionality to cause the expression displayed in the expression control (154) to be contextualized relative to the context displayed in the context control (158) (e.g., when a click on a "contextualize" button of the context control (158) is detected).

The expression tree window (152) may include a tree control (160) and node controls (162A, 162N). In one or more embodiments, the tree control (160) includes functionality to display an expression as a tree of nodes, where a node may correspond to an operator (e.g., (112A) of FIG. 1B) or an input (e.g., (142A) of FIG. 1B). The tree control (160) may include functionality to evaluate an expression tree corresponding to the expression displayed in the expression tree window (152) (e.g., in response to user input, such as clicking on an "evaluate" button of the tree control (160)).

In one or more embodiments, each node control (162N) includes functionality to display a node in the expression tree displayed by the tree control (160), where the node corresponds to a sub-expression of the expression tree. The node control (162N) may include functionality to evaluate its corresponding sub-expression (e.g., in response to user input, such as clicking on an "evaluate" button corresponding to the node control (162N)). The node control (162N) may include functionality to adjust the level of detail with which its corresponding sub-expression is displayed. For example, an input node of a sub-expression may be expanded into an operator node and one or more input nodes (e.g., corresponding to the sub-expression expanded from input A (142A) shown in FIG. 1B).

The node control (162N) may include functionality to display an alert at its corresponding sub-expression. For example, the alert may indicate the violation of a validation rule (e.g., (146$A_K$) of FIG. 1B) by a result of the sub-expression displayed by the node control (162N). Alternatively, the alert may indicate an error due to an input or output violating a constraint of a schema (120) corresponding to an operator of the sub-expression corresponding to the node control (162N). For example, an input to an operator of the sub-expression corresponding to the node control (162N) may be in a format other than the format required by the schema (120) of the operator. Although not shown in FIG. 1C, the GUI (130) may include additional controls and/or components (e.g., various widgets, push button controls, radio button controls, and check box controls).

Returning to FIG. 1A, in one or more embodiments, the parser (110) may be implemented in hardware (e.g., circuitry), software, firmware, and/or any combination thereof. The parser (110) may include functionality to transform input obtained from a user (e.g., a string of alphanumeric characters) via the GUI (130) into an expression (e.g., (140) in FIG. 1B).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2:
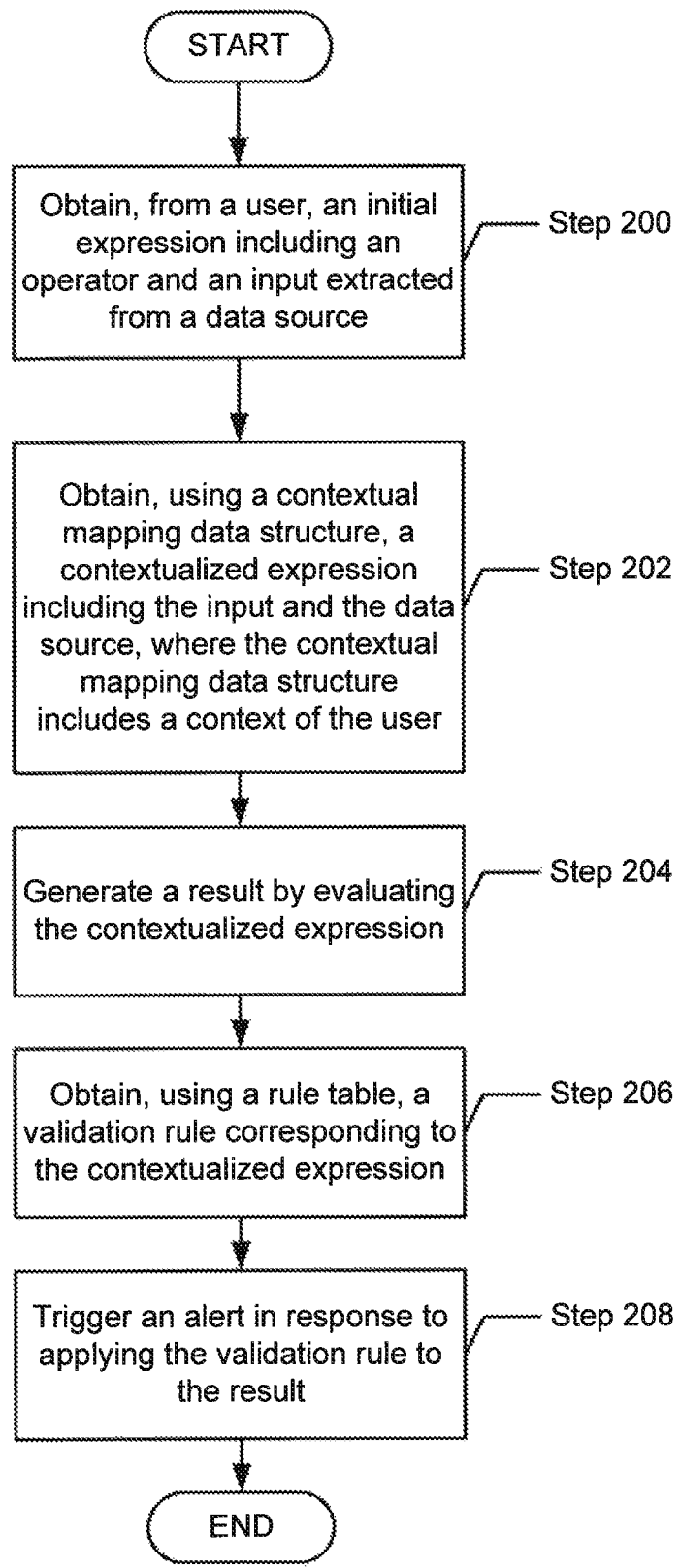
FIG. 2 and FIG. 3 show flowcharts in accordance with one or more embodiments of the invention.

FIG. 2 shows a flowchart in accordance with one or more embodiments of the invention. One or more of the steps in FIG. 2 may be performed by the components (e.g., the expression evaluator (104), the GUI (130), and/or the parser (110) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, an initial expression including an operator and an input extracted from a data source is obtained from a user. The operator may be applied to the input. In one or more embodiments, the initial expression may be obtained from the user via a graphical user interface (GUI). In one or more embodiments, the parser may transform user input obtained via the GUI into the initial expression. The initial expression may be a recursive tree structure, such that the input may be expanded into a sub-expression, where an input of the sub-expression may be expanded into a sub-sub-expression, etc. Alternatively, the initial expression may be a recursive tree structure, such that the operator may include sub-operators, each of which may include sub-sub-operators, etc.

The data source may be a database system that includes, for example, structured data that represents financial transactions, business assets and/or inventory, etc. In one or more embodiments, the data source may be represented as a variable in the initial expression. For example, the variable may be assigned to a specific data source using a context of the user (e.g., the context may include a runtime variable that represents a data source associated with the user).

In Step 202, a contextualized expression including the input and the data source is obtained, using a contextual mapping data structure, from the initial expression. The contextual mapping data structure may map the initial expression to the contextualized expression using a context of the user. In one or more embodiments, the contextualized expression is obtained automatically once the initial expression is obtained in Step 200 above. In one or more embodiments, the contextualized expression is obtained in response to user input (e.g., when a click on a "contextualize" button of the GUI is detected).

In one or more embodiments, the contextualized expression represents a variation of the initial expression that is adapted (e.g., without re-coding) to the context. The context may include the values of one or more runtime variables each representing properties and/or attributes that describe the environment and/or preferences of a user. For example, a variable in the context may represent a region (e.g., France) associated with the user. As another example, the data source may be determined using the context. For example, the data source may be represented as a variable in the initial expression, where a variable in the context is used to assign a specific data source (e.g., a database of detailed financial transactions) to the variable.

In one or more embodiments, the contextualized expression may be generated from the initial expression by adding, modifying and/or deleting one or more operators of the initial expression and/or adding, modifying and/or deleting one or more inputs of the initial expression. For example, a contextualized expression may be generated from an initial expression that generates a tax report by adapting the initial expression based on the value of a runtime variable (e.g., a region variable whose value is France) of the context of the user. That is, the contextualized expression may calculate the tax using the requirements corresponding to the context.

In Step 204, a result is generated by evaluating the contextualized expression. For example, the contextualized expression may be evaluated by applying each operator of the contextualized expression to the input(s) corresponding to the operator. In one or more embodiments, the contextualized expression may be evaluated in response to user input (e.g., when a click on an "evaluate" button of the GUI is received).

In Step 206, a validation rule corresponding to the contextualized expression is obtained using a rule table. In one or more embodiments, the rule table includes one or more validation rules corresponding to the contextualized expression. In one or more embodiments, the validation rule represents constraints applicable to the contextualized expression. For example, the validation rule may require a result of the contextualized expression to be within a predetermined range of values (e.g., an income level may be required to be within a minimum value and a maximum value).

In Step 208, an alert is triggered in response to applying the validation rule to the result. In one or more embodiments, if the validation rule is violated, then an alert is sent to the user identifying the result, the contextualized expression and the validation rule. In one or more embodiments, the alert may be triggered in response to a violation of a constraint (e.g., an input or result constraint) of a schema of an operator of the contextualized expression.

In one or more embodiments, applying the validation rule may modify the contextualized expression. For example, applying the validation rule may add a new sub-expression (e.g., a sub-expression that is applicable relative to the context of the user) to compare, reconcile and/or categorize the results of different sub-expressions within the contextualized expression.

Figure 3:
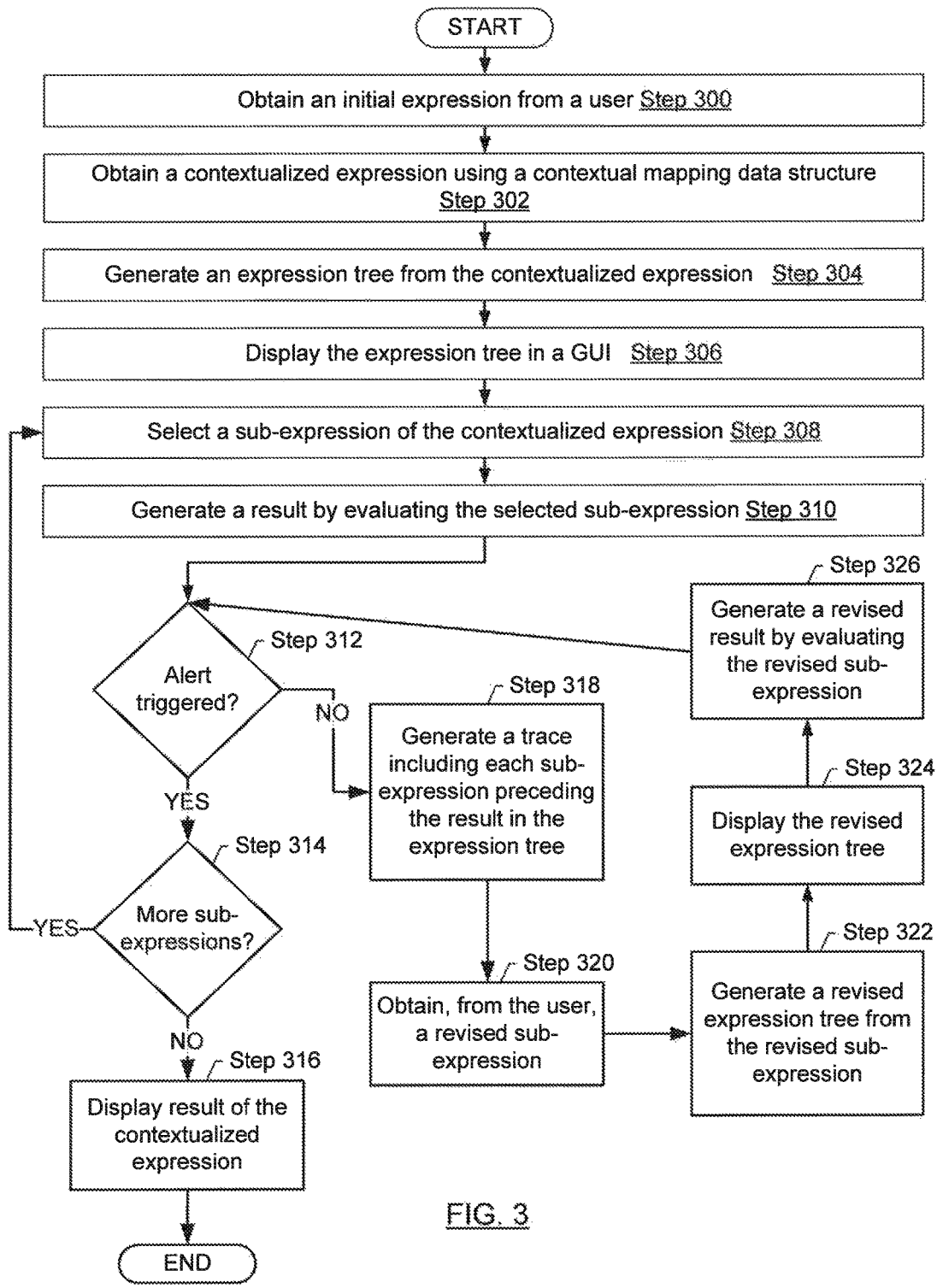

FIG. 3 shows a flowchart in accordance with one or more embodiments of the invention. One or more of the steps in FIG. 3 may be performed by the components (e.g., the expression evaluator (104), the GUI (130), and/or the parser (110) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, an initial expression is obtained from a user (see description of Step 200 above).

In Step 302, a contextualized expression is obtained, using a contextual mapping data structure (see description of Step 202 above).

In Step 304, an expression tree is generated from the contextualized expression. At the top level, the contextualized expression may include an operator and one or more inputs. The contextualized expression may be expanded, recursively, into an expression tree that includes a hierarchy of sub-expressions, where each sub-expression, in turn, includes an operator and one or more inputs. For example, an input I of the contextualized expression may be expanded into a sub-expression whose result is input I. And an input J of the sub-expression may be expanded into a sub-sub-expression whose result is input J, etc.

In Step 306, the expression tree is displayed in a GUI. In one or more embodiments, the GUI displays the expression tree as a tree of nodes each representing an input or an operator corresponding to a sub-expression of the hierarchy of sub-expressions. The GUI (e.g., the node control) may adjust the level of detail with which a sub-expression is displayed. For example, an input node of a sub-expression may be expanded into an operator node corresponding to an operator and "sub-input" nodes that correspond to the inputs of the operator.

In Step 308, a sub-expression of the contextualized expression is selected. That is, the expression evaluator may begin traversing the expression tree by selecting a sub-expression, to be evaluated in Step 310 below. In one or more embodiments, the traversal of the expression tree may be a depth-first-traversal, a breadth-first-traversal, or any other traversal. Alternatively, the sub-expression may be selected by the user (e.g., by clicking on a node displayed in the GUI that corresponds to the sub-expression).

In one or more embodiments, the traversal of multiple sub-expressions of the expression tree may be performed in parallel (e.g., when the evaluation of each of the multiple sub-expressions is independent of the evaluation of the other multiple sub-expressions).

In Step 310, a result is generated by evaluating the selected sub-expression (see description of Step 204 above). In one or more embodiments, the result is displayed by the GUI in response to the evaluation of the selected sub-expression. In one or more embodiments, the format (e.g., JSON, alphanumeric string, money, etc.) of the result is indicated by a formatting operator within the selected sub-expression.

If, in Step 312, the result triggers an alert (see description of Step 208 above), then Step 314 below is executed. The alert may be displayed in the GUI. For example, the alert may be displayed at a node of the expression tree corresponding to the selected sub-expression. Otherwise, if an alert is not triggered, then Step 318 below is executed.

If, in Step 314, it is determined that there are additional sub-expressions of the contextualized expression that have not yet been traversed, then Step 308 above is again executed, to select a next sub-expression (e.g., where the result generated in Step 310 above becomes an input to the next sub-expression). Otherwise, if Step 314 determines that each sub-expression of the contextualized expression has already been traversed and evaluated, then, in Step 316, the result of the contextualized expression is displayed (e.g., in the result control of the GUI).

In Step 318, a trace including each sub-expression in the expression tree preceding the selected sub-expression is generated. That is, the trace is a path through the expression tree leading to the selected sub-expression. The trace may be viewed as an "explanation" or history of how the result (e.g., the value of a cell in a report) of the selected sub-expression was generated. For example, examining the chain of results of the sub-expressions in the trace may be helpful in assisting the user to determining how to revise the selected sub-expression to avoid triggering the alert.

In Step 320, a revised sub-expression is obtained from the user. That is, the user may revise the sub-expression in an attempt to comply with a violated validation rule (see description of Step 208 above), to avoid triggering the alert. In one or more embodiments, the user may revise the sub-expression by adding, modifying and/or deleting one or more operators of the selected sub-expression and/or adding, modifying and/or deleting one or more inputs of the selected sub-expression. In one or more embodiments, the user's revisions may extend beyond the selected sub-expression, resulting in revisions to other sub-expressions of the contextualized expression. In one or more embodiments, when the revisions to the contextualized expression are far-reaching, and not localized to the selected sub-expression, evaluation of the revised expression may restart at Step 302 above.

In Step 322, a revised expression tree is generated from the revised sub-expression (see description of Step 304 above).

In Step 324, the revised expression tree is displayed in the GUI (see description of Step 306 above).

In Step 326, a revised result is generated by evaluating the revised sub-expression (see description of Step 310 above). Execution then continues with Step 312 above, to determine whether the evaluating the revised sub-expression will trigger the alert.

The following example is for explanatory purposes only and not intended to limit the scope of the invention. FIG. 4A, FIG. 4B, FIG. 4C, and FIG. 4D show an implementation example in accordance with one or more embodiments of the invention.

Figure 4A:
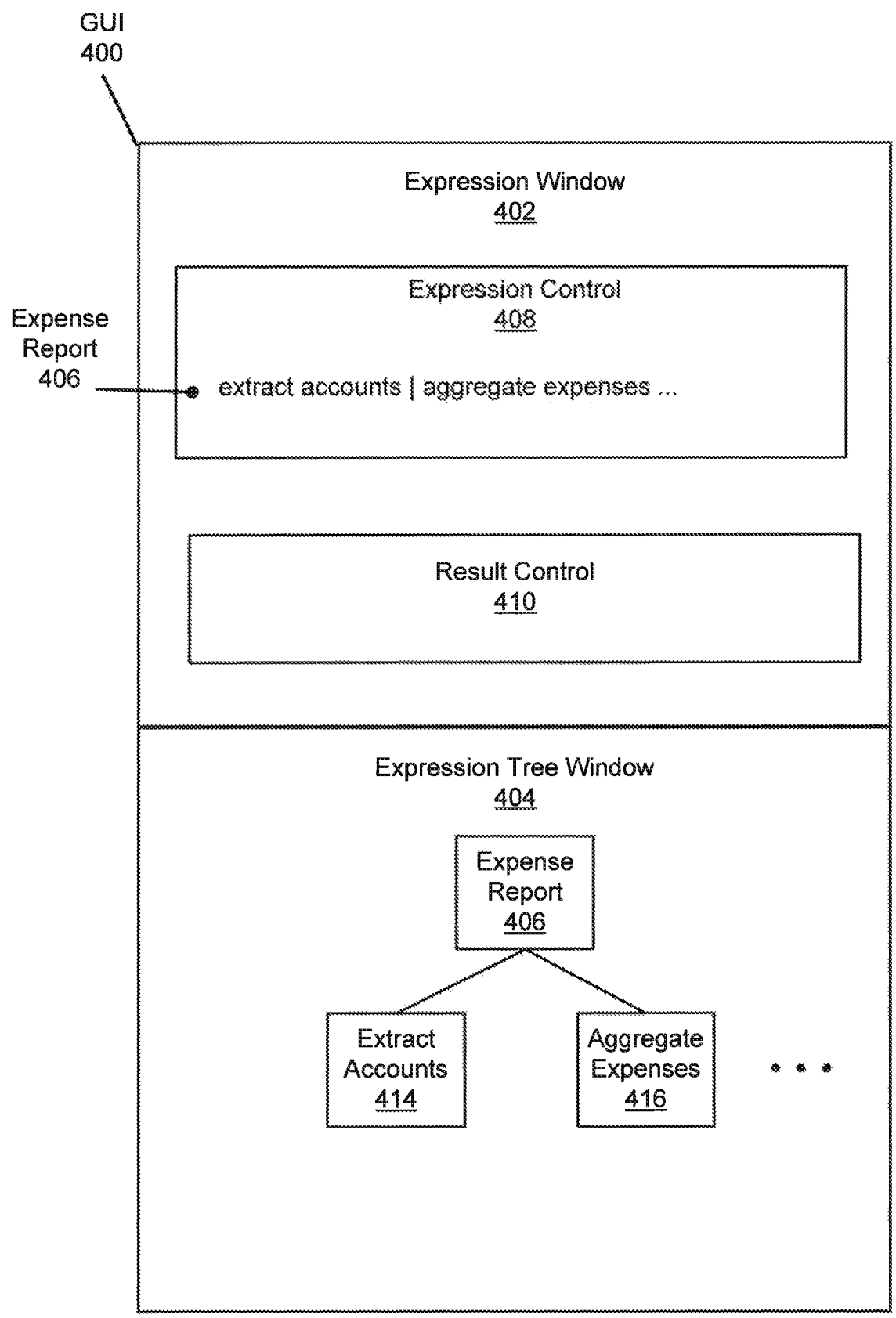
FIG. 4A, FIG. 4B, FIG. 4C, and FIG. 4D show examples in accordance with one or more embodiments of the invention.

FIG. 4A illustrates a graphical user interface (GUI) (400) ((130) in FIG. 1A), which includes an expression window (402) and an expression tree window (404). The expression window (402) includes an expression control (408) that accepts an initial expression, in this case, expense report (406), from Bob, a user. The expression window (402) also includes a result control (410) to display the result of evaluating the expression displayed in the expression control (408).

The expression tree window (404) of FIG. 4A illustrates the expense report expression (406) rendered as an expression tree that includes an extract accounts operator (414) and an aggregate expenses operator (416). The extract accounts operator (414) extracts accounts from a data source, in this case a database of detailed financial transactions. The aggregate expenses operator (416) aggregates expenses from a collection of accounts (i.e., the accounts extracted by the extract accounts operator (414)).

Figure 4B:
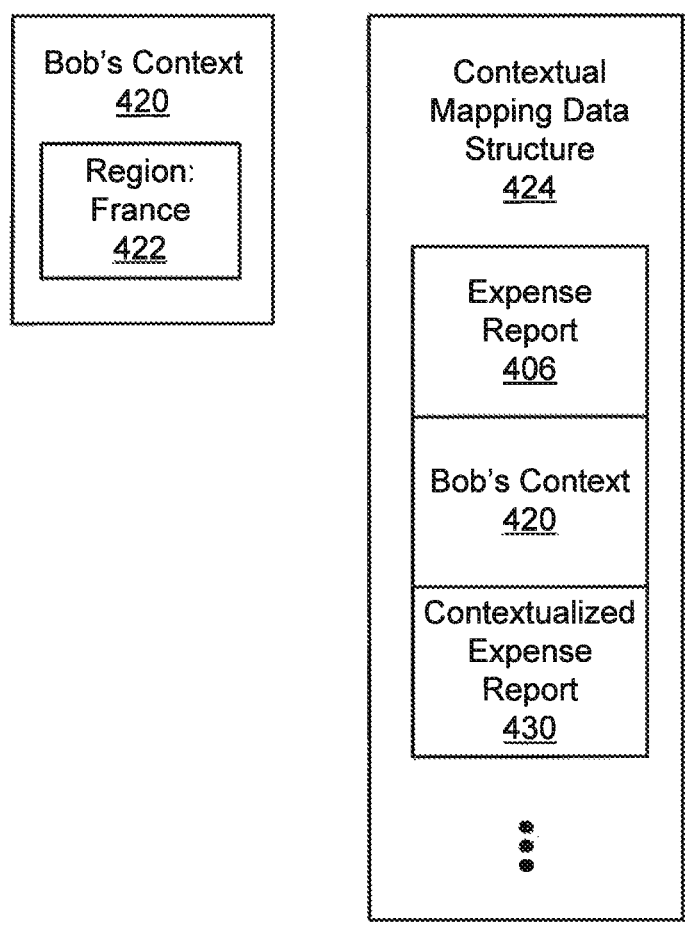

The expression evaluator ((104) in FIG. 1A) obtains the expense report expression (406) from the GUI (400). Next, the expression evaluator (104) adapts the expense report expression (406) to a context of Bob. Bob's context (420) includes a runtime variable called "region" (422), which has the value "France", as shown in FIG. 4B. The expression evaluator (104) consults the contextual mapping data structure (424), which maps, using Bob's context (420), the expense report expression (406) to a contextualized expense report expression (430), as shown in FIG. 4B.

Figure 4C:
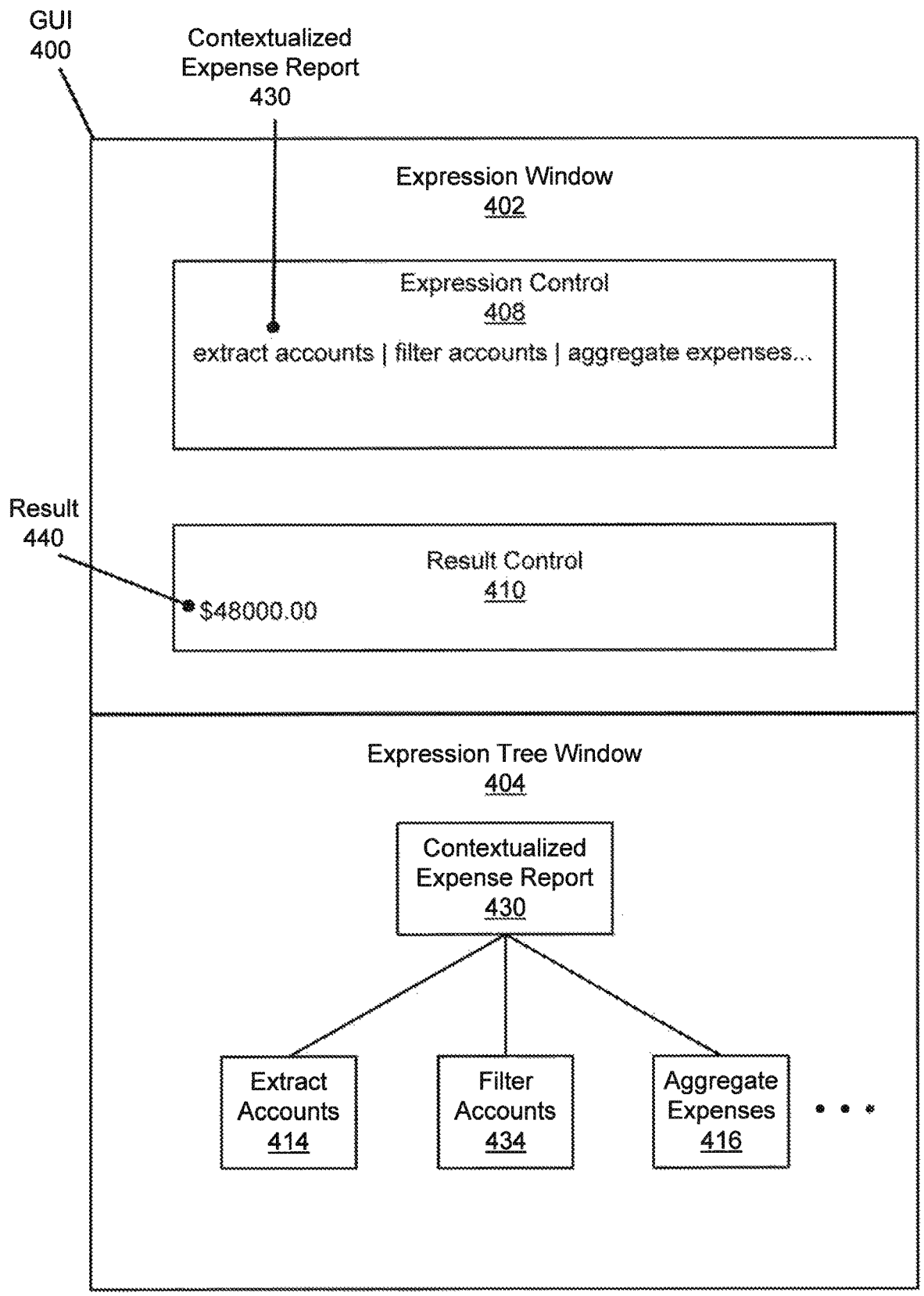

The expression evaluator (104) then instructs the GUI (400) to update the expression window (402) and the expression tree window (404) using the contextualized expense report expression (430), as shown in FIG. 4C. FIG. 4C shows that the contextualized expense report expression (430) includes, in addition to the extract accounts operator (414), a filter accounts operator (434). The filter accounts operator (434) extracts a subset of the accounts extracted by the extract accounts operator (414). That is, in this scenario, when Bob's context (420) includes France, only specific accounts are to be considered when generating the expense report. The filter accounts operator (434) extracts the subset of accounts using a predicate applied to the account name. In this scenario, the predicate is true when the prefix of the account name is the number 6.

As shown in FIG. 4C, the expression evaluator (104) then generates a result (440) by evaluating the contextualized expense report expression (430). The result (440) is displayed in the result control (410) of the expression window (402), as shown in FIG. 4C. Next, the expression evaluator (104) obtains, from a rule table, a validation rule corresponding to the contextualized expense report expression (430). The validation rule attempts to reconcile the result (440) using a different data source, in this case, a data source containing aggregated (i.e., summary) data on financial transactions.

However, when the expression evaluator (104) applies the validation rule to the result (440), a violation is detected, and the expression evaluator (104) triggers an alert, since the result (440) differs from the value generated by applying the validation rule. The GUI (400) then displays the alert by highlighting, in the expression tree window (404), the node in the expression tree that generated the result (440), in this case, the aggregate expenses operator (416). The expression evaluator (104) also generates a trace that shows the series of operators that were executed prior to executing the aggregate expenses operator (416). In this case, the trace includes the extract accounts operator (414) and the filter accounts operator (434). The GUI (400) then displays the trace to Bob, to help Bob determine how to respond to the alert.

Figure 4D:
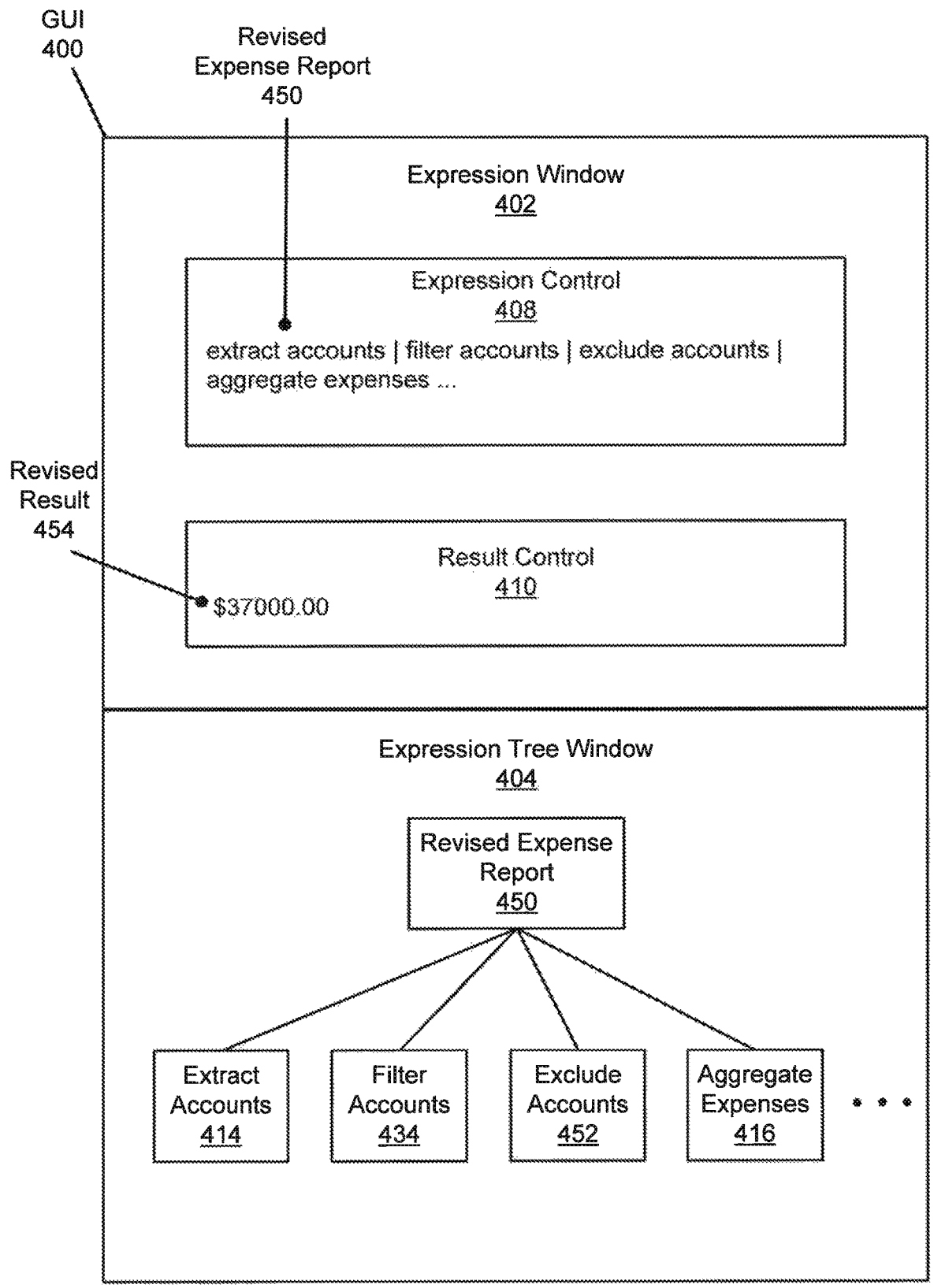

After some analysis, Bob realizes that the discrepancy between the result (440) and the value expected based on applying the validation rule was due to the inclusion, by the filter accounts operator (434), of some accounts that should have been excluded from the report. It turns out that not all accounts whose account name starts with 6 should have been included, since those accounts whose account name has a prefix of 601 should have been excluded from the report. Bob then adds an exclude accounts operator (452) to a revised expense report expression (450) via the expression control (408), as shown in FIG. 4D. The exclude accounts operator (452) removes the accounts whose prefix is 601. The GUI (400) then updates the expression tree displayed in the expression tree window (404) to include the exclude accounts operator (436), as shown in FIG. 4D. The expression evaluator (104) then generates a revised result (454) by evaluating the revised expense report expression (450). Then the expression evaluator (104) successfully applies the validation rule to the revised result (454) without generating an alert.

Figure 5A:
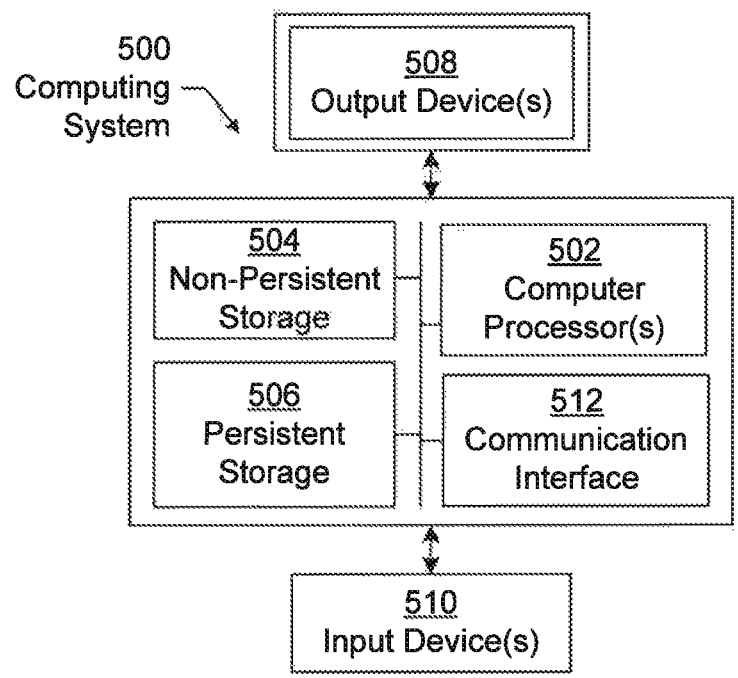
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
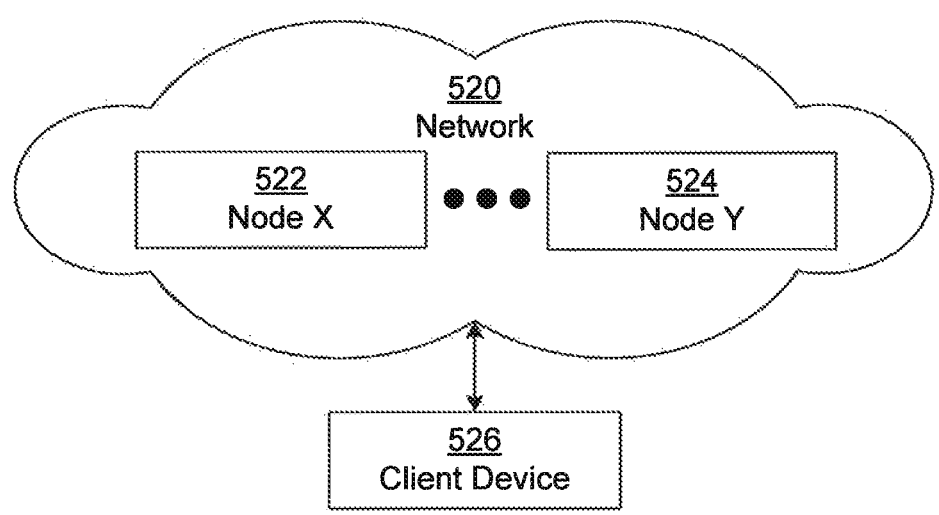

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining, from a first user, an initial expression comprising a first operator and an input extracted from a first data source, wherein the first operator is applied to the input;
   obtaining, using a contextual mapping data structure, a first contextualized expression comprising the input and the first data source, wherein the contextual mapping data structure comprises a first context corresponding to the first user;
   generating a first result by evaluating the first contextualized expression;
   generating, from the first contextualized expression, an expression tree comprising a node corresponding to the first result;
   obtaining, using a rule table, a first validation rule corresponding to the first contextualized expression;
   applying the first validation rule to the first result; and
   in response to applying the first validation rule to the first result:
      triggering a first alert to notify the first user of a violation of the first validation rule;
      displaying, in a graphical user interface (GUI), the first alert at the node corresponding to the first result; and
      modifying the first contextualized expression to further comprise a second operator that analyzes the first result using a second data source.

2. The method of claim 1, further comprising:
   in response to triggering the first alert, obtaining a revised expression from the user;
   generating a revised result by evaluating the revised expression; and
   validating the revised result using the first validation rule.

3. The method of claim 1, further comprising:
in response to triggering the first alert, generating a trace comprising a path in the expression tree preceding the node corresponding to the first result; and
displaying the trace in the GUI.

4. The method of claim 1, further comprising:
obtaining, from a second user, the initial expression;
obtaining, using the contextual mapping data structure, a second contextualized expression, wherein the contextual mapping data structure comprises a second context corresponding to the second user;
generating a second result by evaluating the second contextualized expression;
obtaining, using the rule table, a second validation rule corresponding to the second contextualized expression; and
triggering a second alert in response to applying the second validation rule to the second result.

5. The method of claim 1, further comprising:
determining the first data source using the first context.

6. The method of claim 1, wherein the first context comprises a value of a runtime variable of a computer system that evaluates the first contextualized expression.

7. A system, comprising:
a processor;
a plurality of data sources;
a repository configured to store a plurality of operators, a plurality of contexts, a plurality of initial expressions, a plurality of contextualized expressions, a rule table, and a contextual mapping data structure configured to map the plurality of initial expressions to the plurality of contextualized expressions using the plurality of contexts; and
a memory comprising instructions that, when executed by the processor, cause the processor to:
obtain, from a first user, an initial expression of the plurality of initial expressions, wherein the initial expression comprises a first operator of the plurality of operators and an input extracted from a first data source of the plurality of data sources, wherein the first operator is applied to the input;
obtain, using the contextual mapping data structure, a first contextualized expression of the plurality of contextualized expressions, wherein the first contextualized expression comprises the input and the first data source, wherein the contextual mapping data structure comprises a first context of the plurality of contexts corresponding to the first user;
generate a first result by evaluating the first contextualized expression;
generate, from the first contextualized expression, an expression tree comprising a node corresponding to the first result;
obtain, using the rule table, a first validation rule corresponding to the first contextualized expression;
apply the first validation rule to the first result; and
in response to applying the first validation rule to the first result:
trigger a first alert to notify the first user of a violation of the first validation rule;
display, in a graphical user interface (GUI) rendered on the display device, the first alert at the node corresponding to the first result; and
modify the first contextualized expression to further comprise a second operator that analyzes the first result using a second data source.

8. The system of claim 7, wherein the memory further comprises instructions that, when executed by the processor, cause the processor to:
in response to triggering the first alert, obtain a revised expression from the user;
generate a revised result by evaluating the revised expression; and
validate the revised result using the first validation rule.

9. The system of claim 7, wherein the memory further comprises instructions that, when executed by the processor, cause the processor to:
in response to triggering the first alert, generate a trace comprising a path in the expression tree preceding the node corresponding to the first result; and
display the trace in the GUI.

10. The system of claim 7, wherein the memory further comprises instructions that, when executed by the processor, cause the processor to:
obtain, from a second user, the initial expression;
obtain, using the contextual mapping data structure, a second contextualized expression, wherein the contextual mapping data structure comprises a second context corresponding to the second user;
generate a second result by evaluating the second contextualized expression;
obtain, using the rule table, a second validation rule corresponding to the second contextualized expression; and
trigger a second alert in response to applying the second validation rule to the second result.

11. The system of claim 7, wherein the memory further comprises instructions that, when executed by the processor, cause the processor to:
determine the first data source using the first context.

12. The system of claim 7, wherein the first context comprises a value of a runtime variable.

13. A graphical user interface (GUI) comprising:
an expression workspace comprising:
an expression control that accepts, from a user, an initial expression comprising a first operator and an input extracted from a first data source;
a result control that:
displays a result generated by evaluating a contextualized expression, wherein the contextualized expression is obtained using a contextual mapping data structure, wherein the contextualized expression comprises the input and the first data source, wherein the contextual mapping data structure comprises a context corresponding to the user; and
modifies the contextualized expression to further comprise a second operator that analyzes the result using a second data source; and
an expression tree workspace comprising:
a tree control that displays an expression tree generated from the contextualized expression, wherein the expression tree comprises a node corresponding to the result; and
a node control that displays an alert at the node corresponding to the result, wherein the alert is triggered to notify the user of a violation of a validation rule in response to applying the validation rule to the result, wherein the validation rule corresponds to the contextualized expression, and wherein the contextualized expression is modified in response to applying the validation rule to the result.

14. The GUI of claim 13, wherein the expression control, in response to the node control displaying the alert, accepts a revised expression from the user, wherein the validation rule is used to validate a revised result generated by evaluating the revised expression.

15. The GUI of claim 13, wherein the tree control, in response to the node control displaying the alert, displays a trace comprising a path in the expression tree preceding the node corresponding to the result.

16. The GUI of claim 13, wherein the expression workspace further comprises:
   a context control that obtains the context from the user.

17. The GUI of claim 13, wherein the first data source is determined using the context.

\* \* \* \* \*